United States Patent
Torab Jahromi

(10) Patent No.: US 10,433,212 B2
(45) Date of Patent: Oct. 1, 2019

(54) UNSCHEDULED POWER SAVE MODE WITH PEER DEVICE NOTIFICATION

(71) Applicant: BROADCOM CORPORATION, Irvine, CA (US)

(72) Inventor: Payam Torab Jahromi, Laguna Niguel, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 135 days.

(21) Appl. No.: 15/197,651

(22) Filed: Jun. 29, 2016

(65) Prior Publication Data

US 2016/0381602 A1 Dec. 29, 2016

Related U.S. Application Data

(60) Provisional application No. 62/186,345, filed on Jun. 29, 2015.

(51) Int. Cl.
*H04W 28/12* (2009.01)
*H04W 52/02* (2009.01)
*H04W 4/70* (2018.01)

(52) U.S. Cl.
CPC ............ *H04W 28/12* (2013.01); *H04W 4/70* (2018.02); *H04W 52/02* (2013.01); *Y02D 70/00* (2018.01); *Y02D 70/142* (2018.01); *Y02D 70/144* (2018.01)

(58) Field of Classification Search
CPC ..... H04W 28/12; H04W 52/02; H04W 4/005; H04W 76/023; H04W 52/0212; H04L 63/1416; H04L 1/1671; H04L 12/12
See application file for complete search history.

(56) References Cited

U.S. PATENT DOCUMENTS

| 9,019,943 | B2* | 4/2015 | Dwivedi | H04W 76/023 370/338 |
| 9,485,728 | B1* | 11/2016 | Banerjea | H04W 52/0212 |
| 2007/0086369 | A1* | 4/2007 | Tang | H04L 63/1416 370/318 |
| 2010/0278088 | A1* | 11/2010 | Goldman | H04L 1/1671 370/311 |
| 2013/0024706 | A1* | 1/2013 | Katar | H04L 12/12 713/321 |

* cited by examiner

*Primary Examiner* — Vinncelas Louis
(74) *Attorney, Agent, or Firm* — Morgan, Lewis & Bockius LLP

(57) ABSTRACT

A device implementing an unscheduled power save mode with peer notification may include at least one processor that may be configured to receive, from a network coordinator device, an acknowledgement of a request to enter an unscheduled power save mode. The processor may be further configured to, responsive to receipt of the acknowledgment, transmit an indication of entering the unscheduled power save mode to at least one other device of the network and then enter the unscheduled power save mode. While in the unscheduled power save mode, the processor may be configured to receive, from the network coordinator device, an acknowledgement of a request to exit the unscheduled power save mode. The processor may be further configured to exit the unscheduled power save mode responsive to the acknowledgment, and transmit an indication of exiting the unscheduled power save mode to the at least one other device of the network.

19 Claims, 8 Drawing Sheets

UNSCHEDULED POWER SAVE MODE WITH PEER DEVICE NOTIFICATION

CROSS-REFERENCE TO RELATED APPLICATIONS

The present application claims the benefit of U.S. Provisional Patent Application Ser. No. 62/186,345, entitled "Unscheduled Power Save with Peer State Synchronization," filed on Jun. 29, 2015, which is hereby incorporated by reference in its entirety for all purposes.

TECHNICAL FIELD

The present description relates generally to an unscheduled power save mode, including an unscheduled power save mode with peer device notification.

BACKGROUND

Power save mechanisms may extend the battery life of wireless devices, such as 802.11 (Wi-Fi) devices, Bluetooth devices, and the like. When a device in a network enters a power save mode, or a low power mode, the other devices in the network may need to be informed that the device is in the power save mode and therefore may be unavailable for communication.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system, a hybrid power save scheme is implemented that incorporates elements from both centralized and decentralized power save protocols. In the hybrid power save scheme of the subject system, a device requests permission from a network coordinator device, such as a central point of coordination and/or an access point of a network, to transition into or out of an unscheduled power save mode. Upon receiving approval/acknowledgment from the network coordinator device, the device may enter/exit the unscheduled power save mode. Prior to entering, or after exiting, the unscheduled power save mode, the device may directly notify its peers of its unscheduled power save mode transition. The devices in the network may also be periodically notified by the network coordinator device of any devices that are in the unscheduled power save mode, e.g. using the data structure formats described herein. However, the direct peer notification may arrive in advance of the centralized notification, thereby providing peers with an earlier notification of the device's unscheduled power save mode transition.

Thus, the hybrid power save scheme of the subject system is centralized in that the transition of any device into or out of the power save mode is regulated and ultimately broadcast (e.g. advertised) by a single point of coordination, e.g. the network coordinator device, and at the same time the hybrid scheme is decentralized in that devices are able to directly notify peer devices of their state transitions. The direct notification of state transitions may accelerate the convergence of state information throughout the network which provides a technical effect of mitigating unnecessary network transmissions, e.g. transmissions/retransmissions to a peer device that is in a power save mode and therefore cannot receive or acknowledge the transmissions/retransmissions.

Figure 1:
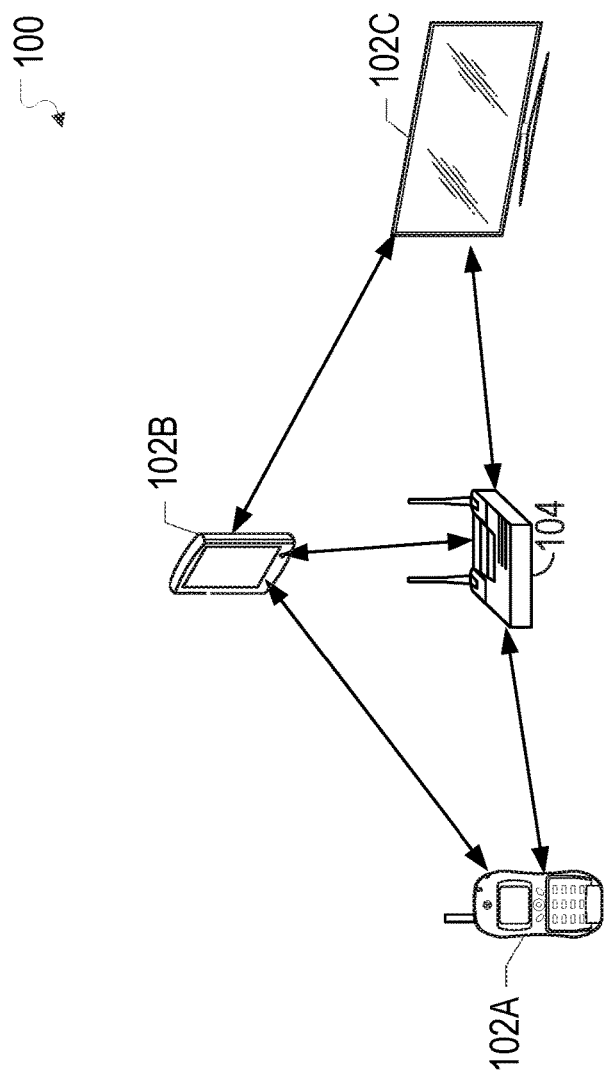
FIG. 1 illustrates an example network environment in which an unscheduled power save mode with peer device notification may be implemented in accordance with one or more implementations.

FIG. 1 illustrates an example network environment 100 in which an unscheduled power save mode with peer device notification may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more network devices 102A-C and at least one network coordinator device 104. For explanatory purposes, the network coordinator device 104 is illustrated as an access point. However, the network coordinator device 104 may also be and/or include, for example, a router device, a switch device, a base station device, one or more of the network devices 102A-C, or generally any network device. In one or more implementations, the network coordinator device 104 may be a personal basic service set (PBSS) coordination point (PCP) where only the network coordinator device 104 transmits beacon frames. Alternatively, or in addition, one or more of the network devices 102A-C may also transmit beacon frames in the example network environment 100. The network coordinator device 104, and/or one or more of the network devices 102A-C, may be coupled to a network, such as the Internet, via wireless or wired transmission media, such as a fiber optic transmission media.

The network devices 102A-C may communicate with the network coordinator device 104 using one or more wireless communication technologies, such as Wi-Fi (e.g. 802.11ac, 802.11ax, etc.), cellular (e.g. 3G, 4G, 5G, etc.), directional multi-gigabit (DMG), and/or mmWave (e.g. 802.11ad, 802.11ay, etc.). The network devices 102A-C may communicate with the network coordinator device 104 using single carrier transmissions and/or multi-carrier transmissions, such as orthogonal frequency-division multiplexing transmissions.

In one or more implementations, one or more of the network devices 102A-C may communicate with the network coordinator device 104 over a wired transmission medium, such as a powerline transmission medium, a coaxial transmission medium, an optical transmission, an Ethernet transmission medium, and the like. One or more of the network devices 102A-C may also communicate directly with one another using peer-to-peer transmissions, e.g. bypassing the network coordinator device 104, and/or independent of coordination from the network coordinator device 104. For explanatory purposes, multiple different wireless and wired technologies are described herein. However, the subject system is PHY-independent and can be uniformly implemented across generally any communication technology.

The network coordinator device 104 may coordinate scheduled power save modes, e.g. periodic power save modes, for the network devices 102A-C and/or the network coordinator device 104 itself. The power save modes may be low power modes where the network coordinator device 104 and/or the network devices 102A-C may conserve power by powering down one or more components, radios, etc. In addition to the scheduled power save modes, the network devices 102A-C and/or the network coordinator device 104 may determine, based on one or more locally determinable factors, e.g. battery life, that it may be desirable to enter an unscheduled power save mode, such as during an awake period between scheduled power save modes.

The network devices 102A-C may, with approval from the network coordinator device, transition into and out of unscheduled power save modes. The network devices 102A-C may also directly notify each other of their transitions in an decentralized manner, e.g. via peer-to-peer communications, which may provide earlier notification than would be possible with a periodic centralized notification, e.g. transmitted by the network coordinator device 104. An example process of a network device 102A performing coordinated transitions into and out of a power save mode while notifying peer devices, e.g. network devices 102B-C, is described further below with regard to FIG. 2, and a timing diagram describing the same is discussed further below with regard to FIG. 4. An example timing diagram of a network coordinator device 104 transitioning into and out of a power save mode is discussed further below with regard to FIG. 5. Timing diagrams for additional scenarios are discussed further below with regard to FIGS. 6 and 7.

In addition to the decentralized peer-to-peer notification of state transitions, the network coordinator device 104 may also periodically transmit a beacon frame that includes a data structure that indicates whether the network coordinator device 104 and each of the network devices 102A-C are in an unscheduled power save mode. The data structure may be arranged to minimize the number of bits required to convey whether the devices 102A-C, 104 are in the unscheduled power save mode. Example data structure formats that may be used to indicate whether the devices 102A-C, 104 are in an unscheduled power save mode are discussed further below with regard to FIG. 3.

Figure 2:
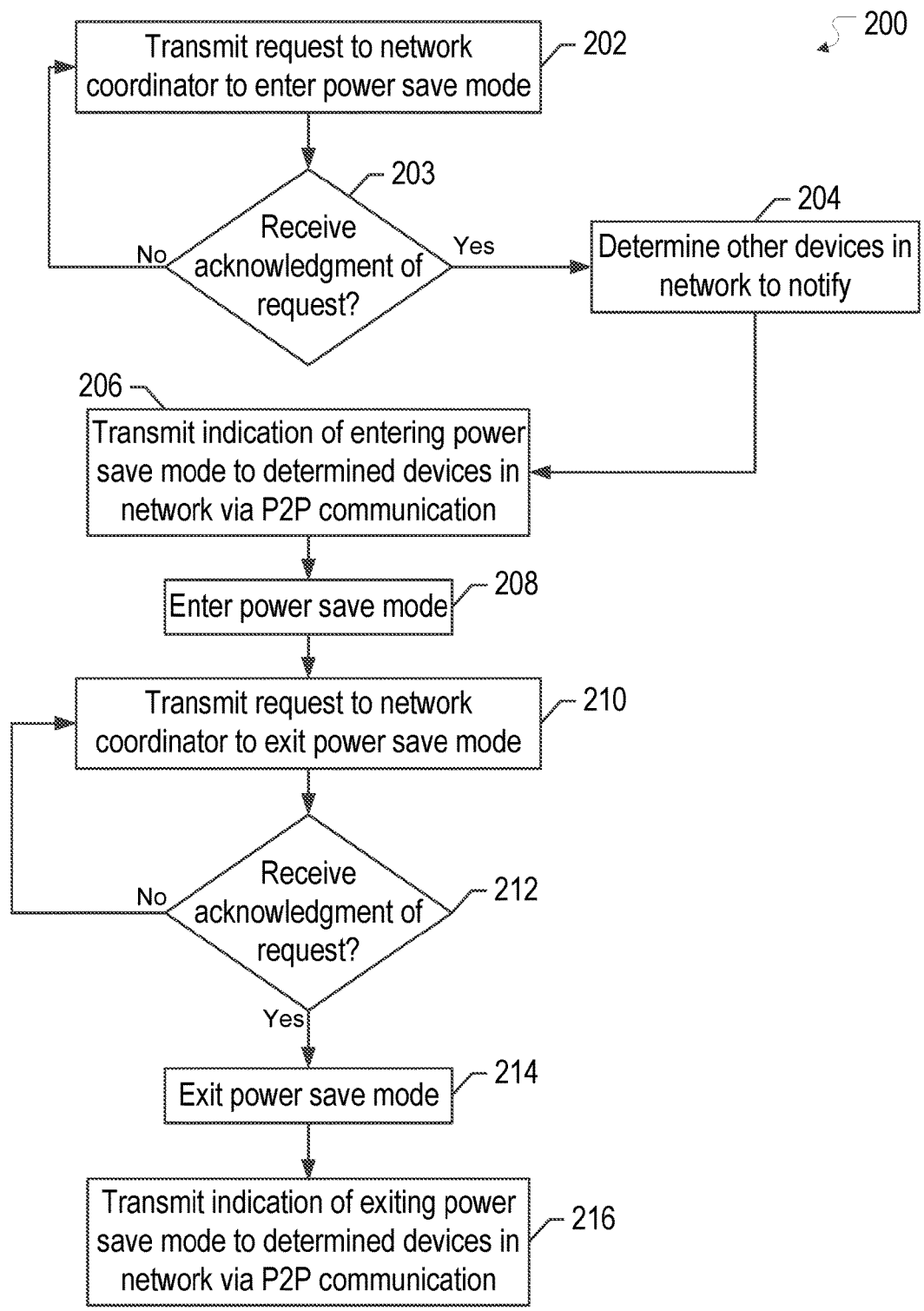
FIG. 2 illustrates a flow diagram of an example process of a network device implementing an unscheduled power save mode with peer device notification in accordance with one or more implementations.

FIG. 2 illustrates a flow diagram of an example process 200 of a network device 102A implementing an unscheduled power save mode with peer device notification in accordance with one or more implementations. For explanatory purposes, the example process 200 is described herein with reference to the electronic devices 102A-C and the network coordinator device 104 of FIG. 1; however, the example process 200 is not limited to the network devices 102A-C or the network coordinator device 104 of FIG. 1. Further for explanatory purposes, the blocks of the example process 200 are described herein as occurring in serial, or linearly. However, multiple blocks of the example process 200 may occur in parallel. In addition, the blocks of the example process 200 need not be performed in the order shown and/or one or more of the blocks of the example process 200 need not be performed.

When one of the network devices 102A-C, such as the network device 102A, determines that it would be beneficial to enter an unscheduled power save mode, e.g. based on remaining battery life and/or other locally determinable factors, the network device 102A transmits a request to enter the unscheduled power save mode to the network coordinator device 104 (202). The request may be, for example, a one-bit power management subfield of a frame that may be set to one to indicate that the network device 102A is requesting to enter the unscheduled power save mode. The network coordinator device 104 determines, based on one or more locally determinable factors such as scheduled transmissions, whether to grant the request of the network device 102A. If the network coordinator device 104 determines that the request cannot be granted, the network coordinator device 104 does not respond to the request. If the network coordinator device 104 determines that the request can be granted, the network coordinator device 104 transmits an acknowledgement of the request to the network device 102A.

The network device 102A determines whether an acknowledgment of the request has been received from the network coordinator device 104 (203). If the acknowledgment has not been received (203), the network device 102A retransmits the request (202) and continues to retransmit the request until the acknowledgment is received or until the network device 102A no longer wishes to enter the unscheduled power save mode, e.g. the network device 102A may enter a scheduled power save mode before receiving acknowledgment from the network coordinator device 104.

If the network device 102A receives an acknowledgment of the request to enter the unscheduled power save mode (203), the network device 102A determines which other network devices 102B-C in the network, if any, to notify that the network device 102A is entering the unscheduled power save mode (204). For example, the network device 102A may determine, based on one or more heuristics, that the network devices 102B-C should be directly notified of the transition of the network device 102A to the unscheduled power save mode. The one or more heuristics may include determining which network devices the network device 102A has recently communicated with, which network devices have notified the network device 102A of their own unscheduled power save mode transitions, and the like.

The network device 102A may then transmit an indication of its intent to enter the unscheduled power save mode to the determined network devices 102B-C via individual peer-to-peer transmissions (206). The peer-to-peer transmissions may be direct communications with each of the network devices 102A-B that bypass the network coordinator device 104 and/or are performed without coordination from the network coordinator device 104. The network devices 102B-C may also receive an indication that the network device 102A has entered the unscheduled power save mode via a periodic notification transmitted in a beacon frame by the network coordinator device 104. However, the peer notification from the network device 102A may arrive sooner than the periodic notification, thereby providing the network devices 102B-C with advance notice of the unscheduled power save mode transition of the network device 102A.

After transmitting the indications to the other network devices 102B-C, the network device 102A enters the unscheduled power save mode (208). The indications transmitted to the other network devices 102B-C may include the same power management subfield, with a value set to one, that was sent to the network coordinator device 104. If the network device 102A is engaged in active transmissions with one or more of the network devices 102B-C, the network device 102A may wait to receive acknowledgments from one or more of the network devices 102B-C before entering the unscheduled power save mode.

The network device 102A may remain in the unscheduled power save mode for any amount of time. The network device 102A may determine a desirable time to exit the power save mode based on one or more locally determinable factors, such as battery life, processing resources, radio availability, etc. When the network device 102A determines that it would be desirable to exit the unscheduled power save mode, the network device 102A transmits a request to the network coordinator device 104 to exit the unscheduled power save mode (210). The request may be, for example, the same one-bit power management subfield of a frame that was used by the network device 102A to request to enter the unscheduled power save mode; however, the power management subfield may be set to zero to indicate that the network device 102A is requesting to exit the unscheduled power save mode. The network coordinator device 104 determines, based on one or more locally determinable factors, whether to grant the request of the network device 102A. If the network coordinator device 104 determines that the request cannot be granted, the network coordinator device 104 does not respond to the request. If the network coordinator device 104 determines that the request can be granted, the network coordinator device 104 transmits an acknowledgement of the request to the network device 102A.

The network device 102A determines whether an acknowledgment of the request has been received from the network coordinator device 104 (212). If the acknowledgment has not been received (212), the network device 102A retransmits the request (210) and continues to retransmit the request until the acknowledgment is received or until the network device 102A no longer wishes to exit the unscheduled power save mode, e.g. the network device 102A may leave the network before receiving acknowledgment from the network coordinator device 104.

If the network device 102A receives an acknowledgment of the request to exit the unscheduled power save mode (212), the network device 102A exits the unscheduled power save mode (214). The network device 102A then transmits an indication that it has exited the unscheduled power save mode to the determined network devices 102B-C via individual peer-to-peer transmissions (216). The indications transmitted to the other network devices 102B-C may include the same power management subfield, with a value set to zero, that was sent to the network coordinator device 104.

The peer-to-peer transmissions may be direct communications with each of the network devices 102A-B that bypass the network coordinator device 104 and/or are performed without coordination from the network coordinator device 104. The notified network devices 102B-C (216) may be the same network devices 102B-C that were notified that the network device 102A was entering the unscheduled power save mode (206), and/or the notified network devices (216) may include additional and/or fewer network devices than those that were notified that the network device 102A was entering the unscheduled power save mode (206).

Figure 3:
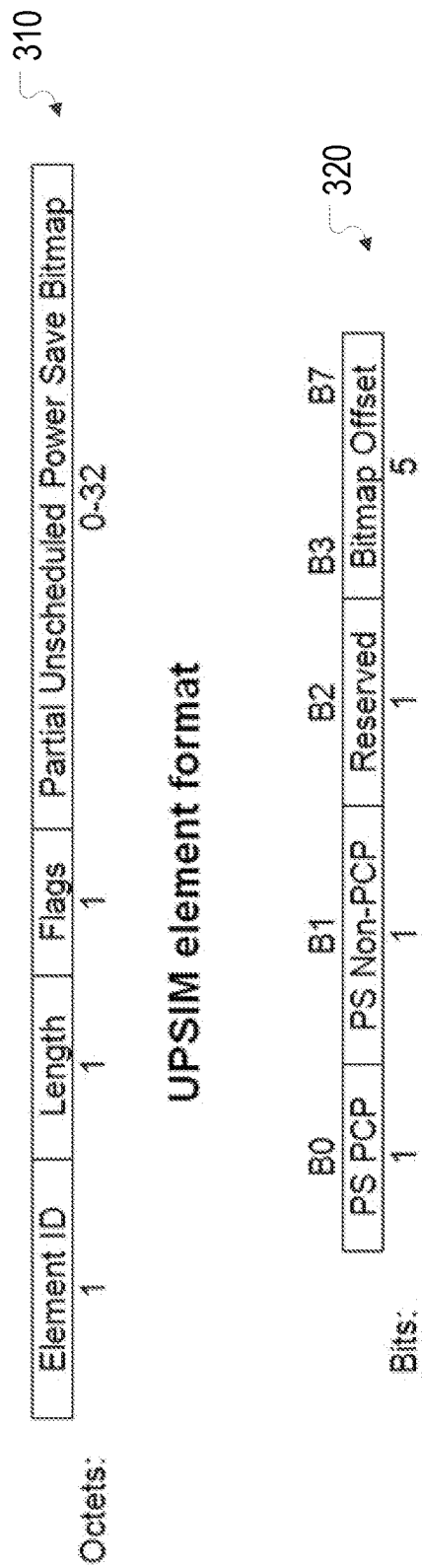
FIG. 3 illustrates example data structure formats for communicating unscheduled power save information in accordance with one or more implementations.

FIG. 3 illustrates example data structure formats 310, 320 for communicating unscheduled power save information in accordance with one or more implementations. The unscheduled power save indication map (UPSIM) format 310 includes an one octet element identifier field, a one octet length field, a one octet flags field, and a thirty-two octet partial unscheduled power save bitmap field. The flags field format 320 includes a one bit network coordinator device unscheduled power save mode field ("PS PCP field"), a one bit non-network coordinator device unscheduled power save mode field ("PS Non-PCP field"), a reserved field, and a bitmap offset field. The network coordinator device 104 may periodically, such as each beacon interval or any number of beacon intervals, transmit a message that includes the UPSIM including the flags field.

The network coordinator device 104 sets the PS PCP field to 1 when the network coordinator device 104 is in an unscheduled power save mode at the time of the transmission of the UPSIM, and the network coordinator device 104 sets the PS PCP field to 0 otherwise. The network coordinator device 104 sets the PS PCP field 0 when in an infrastructure basic service set (BSS). The network coordinator device 104 sets the PS Non-PCP field to 1 when all of non-network coordinator devices, e.g. all non-AP and non-PCP STAs such as the network devices 102A-C, are in an unscheduled power save mode at the time of the transmission of the UPSIM, and network coordinator device 104 sets the PS Non-PCP field to 0 otherwise. The bitmap offset field defines the octet offset into a virtual bitmap maintained by the network coordinator device 104, as is described further below.

The network coordinator device 104 maintains an unscheduled power save indication virtual bitmap that is 256 bits in length and is organized into 32 octets such that bit number N ($0 \leq N \leq 255$) in the bitmap corresponds to bit number (N mod 8) in octet number $\lfloor N/8 \rfloor$, where the low order bit of each octet is bit number 0, and the high order bit is bit number 7. Bit N in the bitmap is set to 1 if there is an associated network device 102A-C, such as the network device 102A, with an identifier, e.g. an association identifier, equal to N and the network device 102A is in an unscheduled power save mode, and is set to 0 if there is no associated network device with an identifier equal to N or the network device 102A is not in an unscheduled power save mode. Bit 0 is set to 0 when in the infrastructure BSS. Bit 255 is set to 0.

In order to reduce the size of the message carrying the UPSIM, the partial unscheduled power save bitmap field is not present when bits numbered 1 to 254 of the unscheduled power save indication virtual bitmap all have the same value at the time of the transmission of the UPSIM. In this case, the length field is set to 1 and the bitmap offset field is set to 0.

When there are two bits in the unscheduled power save indication virtual bitmap with numbers between 1 and 254 and different values, the partial unscheduled power save bitmap field consists of octets numbered N1 to N2 of the unscheduled power save indication virtual bitmap, where N1 is the largest integer such that bits numbered 1 to (N1×8)−1 in the unscheduled power save indication virtual bitmap are all 0, and N2 is the smallest number such that bits numbered (N2+1)×8 to 255 in the unscheduled power save indication virtual bitmap are all 0. In this case, the length field is set to (N2−N1)+2 and the bitmap offset subfield is set to N1. Furthermore, the partial unscheduled power save bitmap field does not need to include bit 0 of the unscheduled power save indication virtual bitmap even if that bit is set.

Thus, the network devices 102A-C that receive the UPSIM from the network coordinator device 104 can determine that all of the devices 102A-C, 104 are in the unscheduled power save mode when the network coordinator device unscheduled power save mode field ("PS PCP field") and the non-network coordinator device unscheduled power save mode field ("PS Non-PCP field") are both set to one. The network devices 102A-C can determine that the network coordinator device 104 is not in the unscheduled power save mode when the network coordinator device unscheduled power save mode field ("PS PCP field") is set to zero. Furthermore, the network devices 102A-C can determine that all of the network devices 102A-C are not in the unscheduled power save mode when the length field is set to one and the non-network coordinator device unscheduled power save mode field ("PS Non-PCP field") is set to zero.

Figure 4:
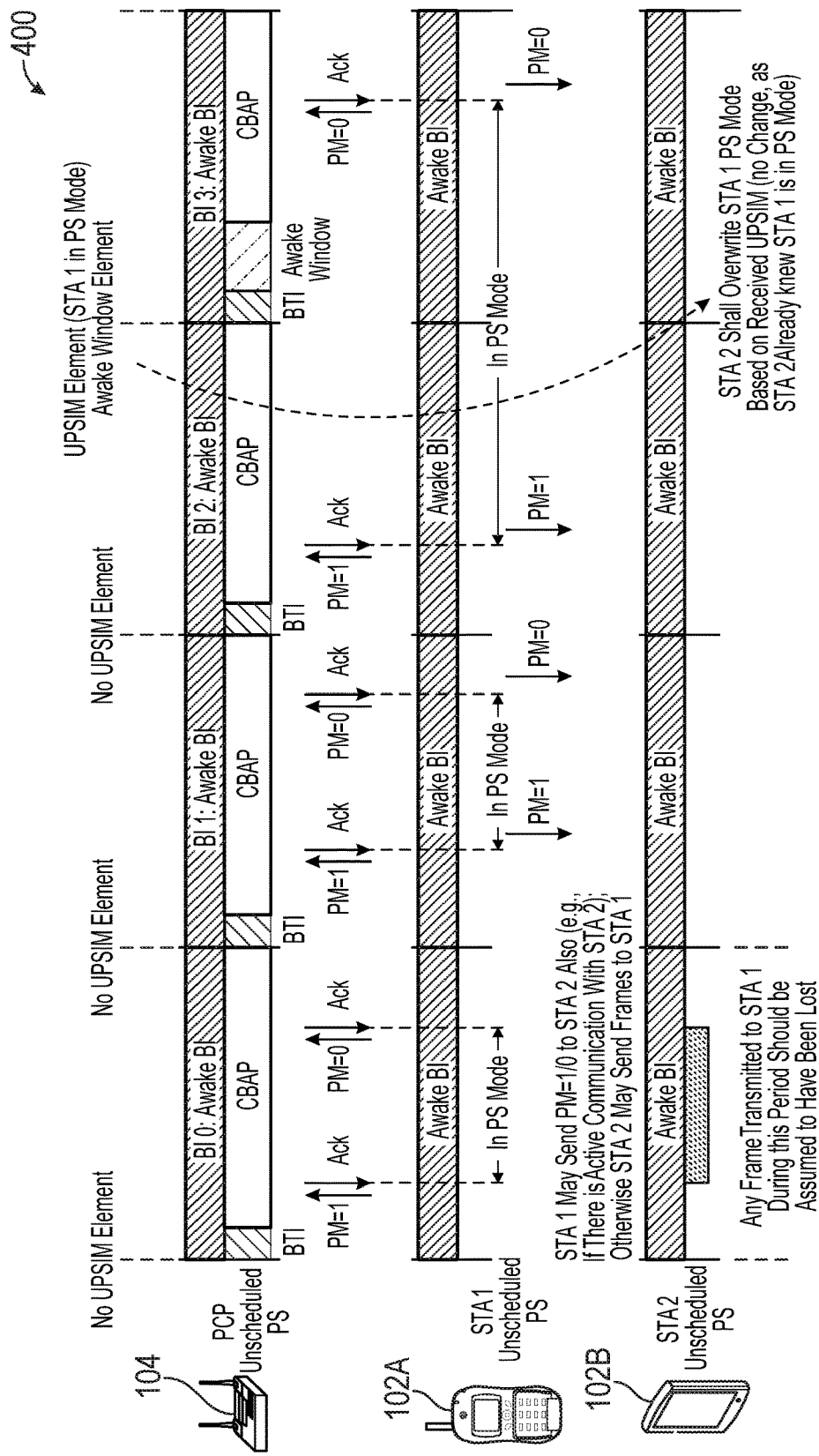
FIG. 4 illustrates an example timing diagram for a network device implementing an unscheduled power save mode with peer device notification in accordance with one or more implementations.

FIG. 4 illustrates an example timing diagram 400 for a network device 102A ("STA 1") implementing an unscheduled power save mode with peer device notification in accordance with one or more implementations. The timing diagram 400 also includes timing for the network coordinator device 104 ("PCP") and the network device 102B ("STA 2").

The timing diagram 400 illustrates that each beacon interval (BI) of the network coordinator device 104 starts with a beacon transmission interval (BTI) and is followed by contention-based access periods (CBAPs). In the timing diagram 400, the network coordinator device 104 and the network devices 102A-B are awake, e.g. the devices 102A-B, 104 are not in scheduled power save modes throughout the timing diagram 400.

In the timing diagram 400, the network device 102A transitions into and out of the unscheduled power save mode throughout the beacon intervals. As shown in the timing diagram 400, the network device 102A transmits a message to the network coordinator device 104 with a power management subfield set to one to indicate that the network device 102A would like to enter the unscheduled power save mode, and with the power management subfield set to zero to indicate that the network device 102A would like to exit the power save mode. Upon receiving an acknowledgement of the message from the network coordinator device 104, the network device 102A enters the unscheduled power save mode.

Upon or before entering or exiting the unscheduled power save mode, the network device 102A may also send a message to the network device 102B with the power management subfield set to one to indicate that the network device 102A is entering the unscheduled power save mode and with the power management subfield set to zero to indicate that the network device 102A is exiting the unscheduled power save mode. The network device 102A may then enter or exit the unscheduled power save mode irrespective of whether an acknowledgement is received from the network device 102B. The network device 102B assumes that any frames that are transmitted to the network device 102A during the period of time that the network device 102A is in the unscheduled power save mode are lost or not received by the network device 102A.

Since the network device 102A enters and exits the unscheduled power save mode within the first beacon interval and then again within the second beacon interval, the network coordinator device 104 does not send out a UPSIM at the start of the second or third beacon intervals. However, because the network device 102A is in the unscheduled power save mode from the third to the fourth beacon interval, the network coordinator device 104 transmits a UPSIM at the start of the fourth beacon interval where the UPSIM indicates that the network device 102A is in the unscheduled power save mode. Although the network device 102B receives the UPSIM indicating that the network device 102A is in the unscheduled power save mode, the network device 102B has already received an indication of the same directly from the network device 102A (e.g. via a peer-to-peer transmission) when the network device 102A entered the unscheduled power save mode during the third beacon interval.

Figure 5:
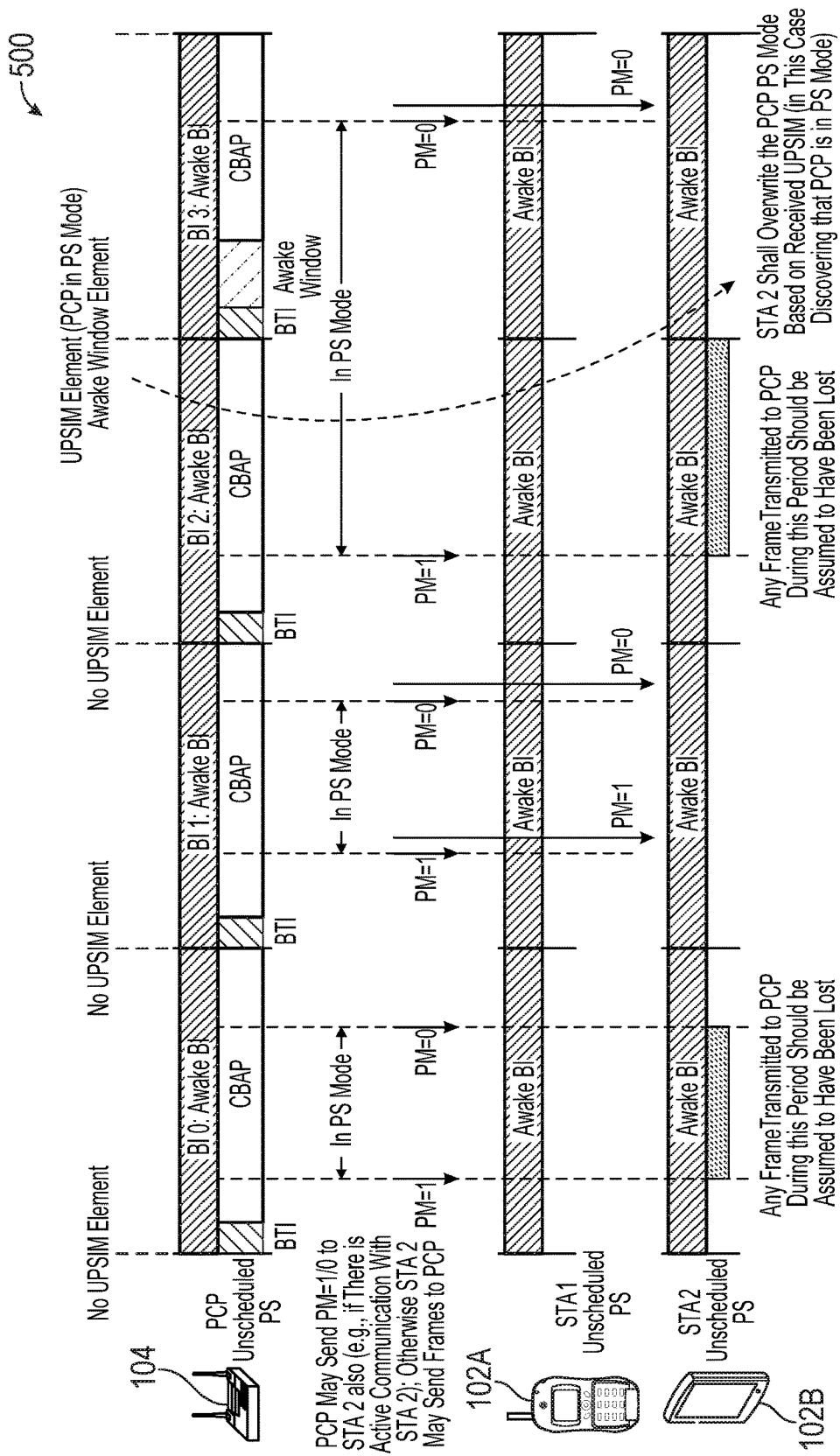
FIG. 5 illustrates an example timing diagram for a network coordinator device implementing an unscheduled power save mode with peer device notification in accordance with one or more implementations.

FIG. 5 illustrates an example timing diagram 500 for a network coordinator device 104 ("PCP") implementing an unscheduled power save mode with peer device notification in accordance with one or more implementations. The timing diagram 500 also includes timing for the network device 102A ("STA 1"), and the network device 102B ("STA 2").

In the timing diagram 500, the network coordinator device 104 transitions into and out of the unscheduled power save mode throughout the beacon intervals. As shown in the timing diagram 400, the network coordinator device 104 does not need to obtain permission or approval from any of the network devices 102A-B before entering the unscheduled power save mode. However, the network coordinator device 104 directly notifies (e.g. via peer-to-peer communications) the network devices 102A-B with which it is actively communicating of its transitions into and out of the unscheduled power save mode. As shown in the timing diagram 500, the network coordinator device 104 only notifies the network device 102A of its unscheduled power save mode transitions during the first beacon interval, but notifies both the network devices 102A-B during the second beacon interval.

Since the network coordinator device 104 enters and exits the unscheduled power save mode within the first beacon interval and then again within the second beacon interval, the network coordinator device 104 does not send out a UPSIM at the start of the second or third beacon intervals. However, because the network coordinator device 104 is in the unscheduled power save mode from the third to the fourth beacon interval, the network coordinator device 104 transmits a UPSIM at the start of the fourth beacon interval that indicates that the network coordinator device 104 is in the unscheduled power save mode.

Figure 6:
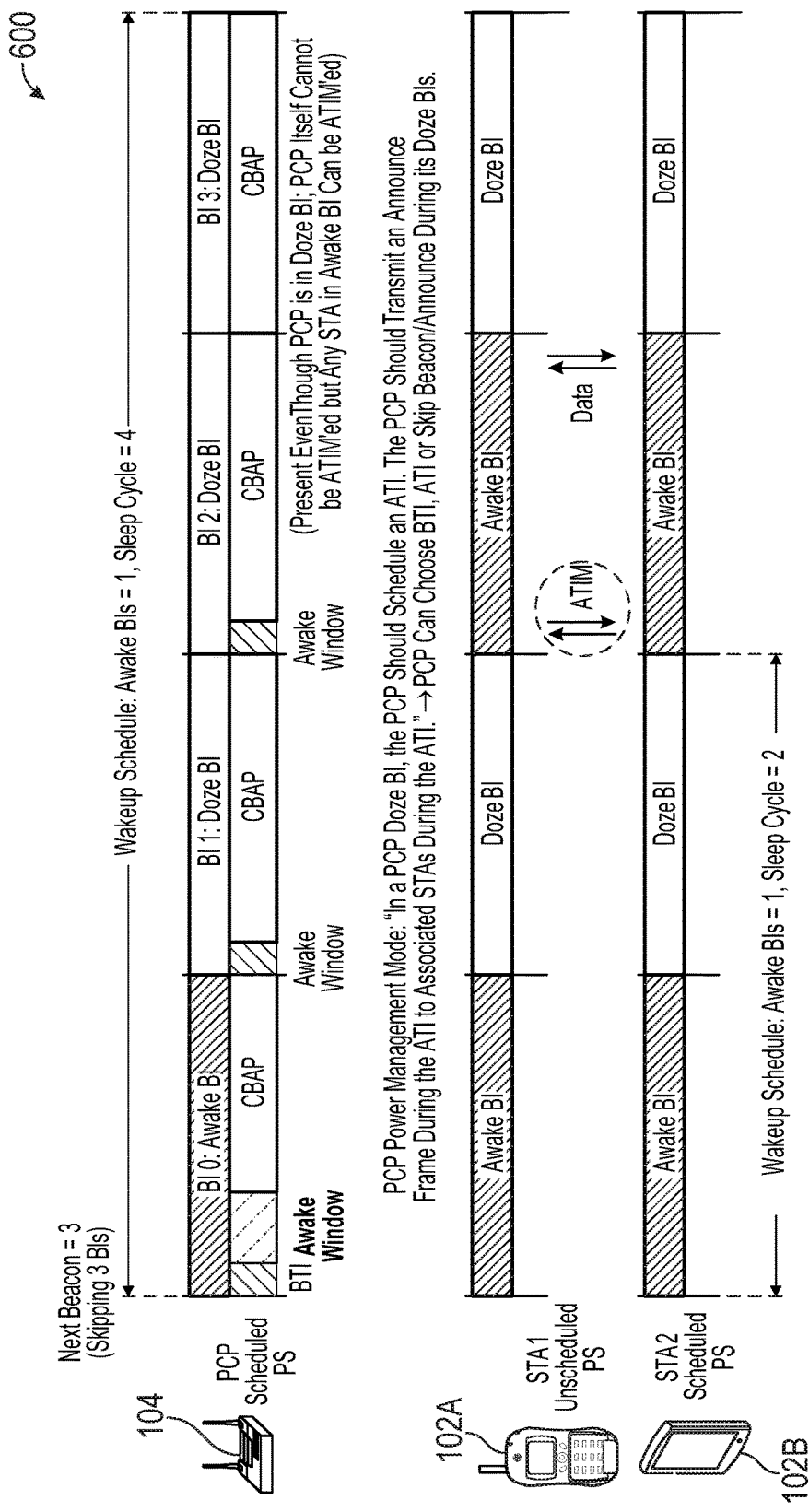
FIG. 6 illustrates an example timing diagram for all devices in a network implementing a scheduled power save mode in accordance with one or more implementations.

FIG. 6 illustrates an example timing diagram 600 for a network device 102A ("STA 1"), a network device 102B ("STA 2"), and a network coordinator device 104 ("PCP") that are all implementing a scheduled power save mode in accordance with one or more implementations. In the timing diagram 600, the network coordinator device 104 has a wakeup schedule of one awake beacon interval with a sleep cycle of four beacon intervals (e.g. three doze beacon intervals), while the network devices 102A-B have a wakeup schedule of one awake beacon interval with a sleep cycle of two beacon intervals (e.g. one doze beacon interval). The doze beacon intervals for a given device, e.g. the network coordinator device 104, may be intervals when the network coordinator device 104 is in a scheduled low power mode.

The network coordinator device 104, while in a doze beacon interval, may schedule an announcement transmission interval (ATI). The network coordinator device 104 transmits an announce frame during the ATI to the associated network devices 102A-B. In one or more implementations, during its doze beacon intervals, the network coordinator device 104 can choose to schedule a BTI or an ATI, or can skip beacon/announce during its doze beacon intervals. In the third beacon interval, the network device 102A has data to transmit to the network device 102B, and therefore the network device 102A transmits an announcement traffic indication message (ATIM) to the network device 102B during the ATI, and the network device 102A subsequently communicates data with the network device 102B in the same beacon interval.

Figure 7:
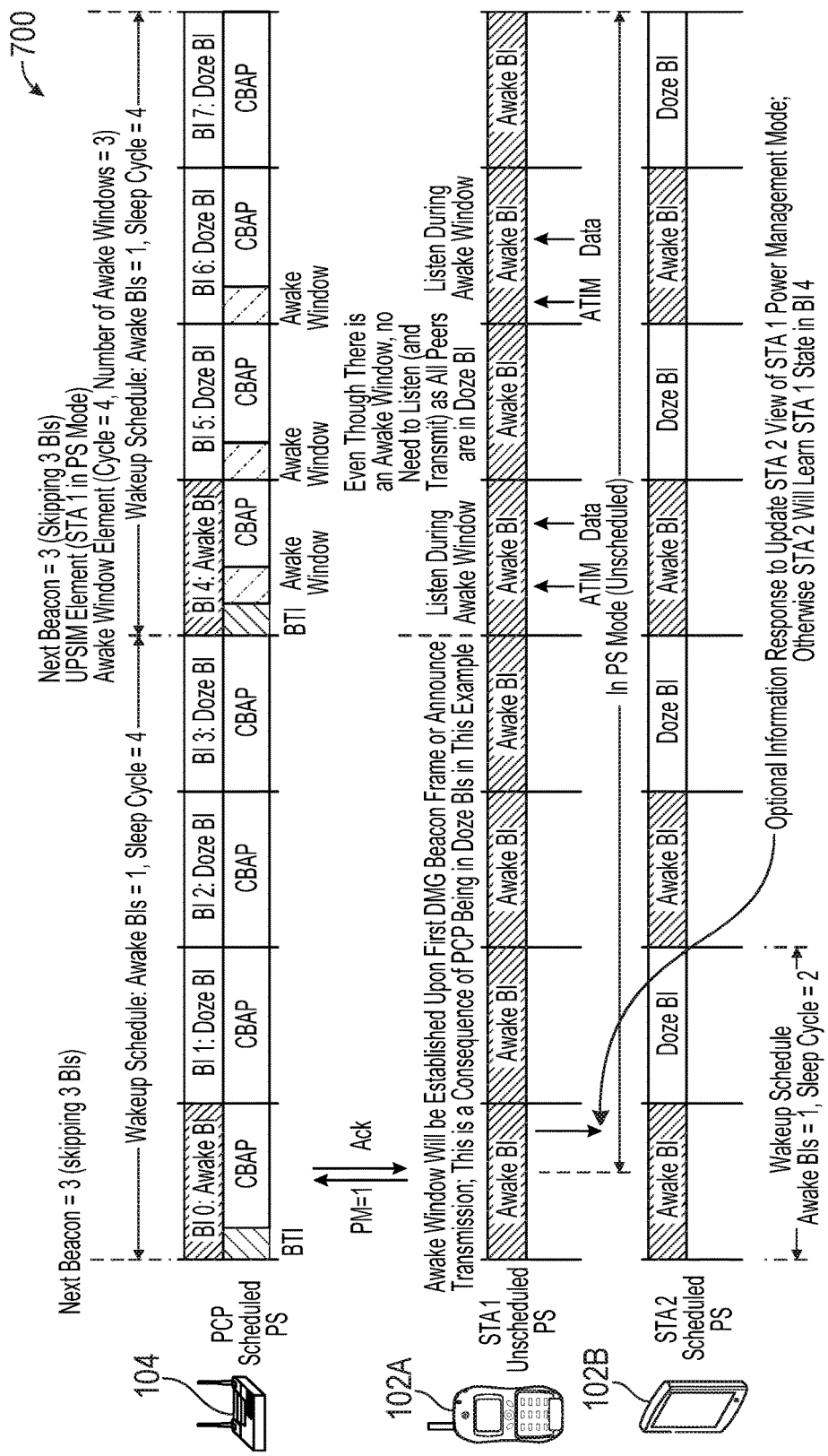
FIG. 7 illustrates an example timing diagram for a network coordinator device and a network device implementing a scheduled power save mode and another network device implementing an unscheduled power save mode with peer notification in accordance with one or more implementations.

FIG. 7 illustrates an example timing diagram 700 for a network coordinator device 104 and a network device 102B implementing a scheduled power save mode and another network device 102A implementing an unscheduled power save mode with peer notification in accordance with one or more implementations. In the timing diagram 700, the network coordinator device 104 has a wakeup schedule of one awake beacon interval with a sleep cycle of four beacon intervals (e.g. three doze beacon intervals), while the network device 102B has a wakeup schedule of one awake beacon interval with a sleep cycle of two beacon intervals (e.g. one doze beacon interval).

In the timing diagram 700, the network device 102A enters the unscheduled power save mode during the first beacon interval. However, since the network coordinator device 104 is in the scheduled power save mode, an awake window is not scheduled until the start of the fifth beacon interval. The network device 102A, although in the unscheduled power save mode, listens for ATIMs during the scheduled awake window. Since the network device 102B transmits an ATIM to the network device 102A during the awake window of the fifth beacon interval, the network device 102A receives a data transmission from the network device 102B during the fifth beacon interval, and similarly during the seventh beacon interval. Since all of the peer devices are in the scheduled power save mode during the sixth beacon interval, the network device 102A does not need to wake up during the awake window of the sixth beacon interval.

Figure 8:
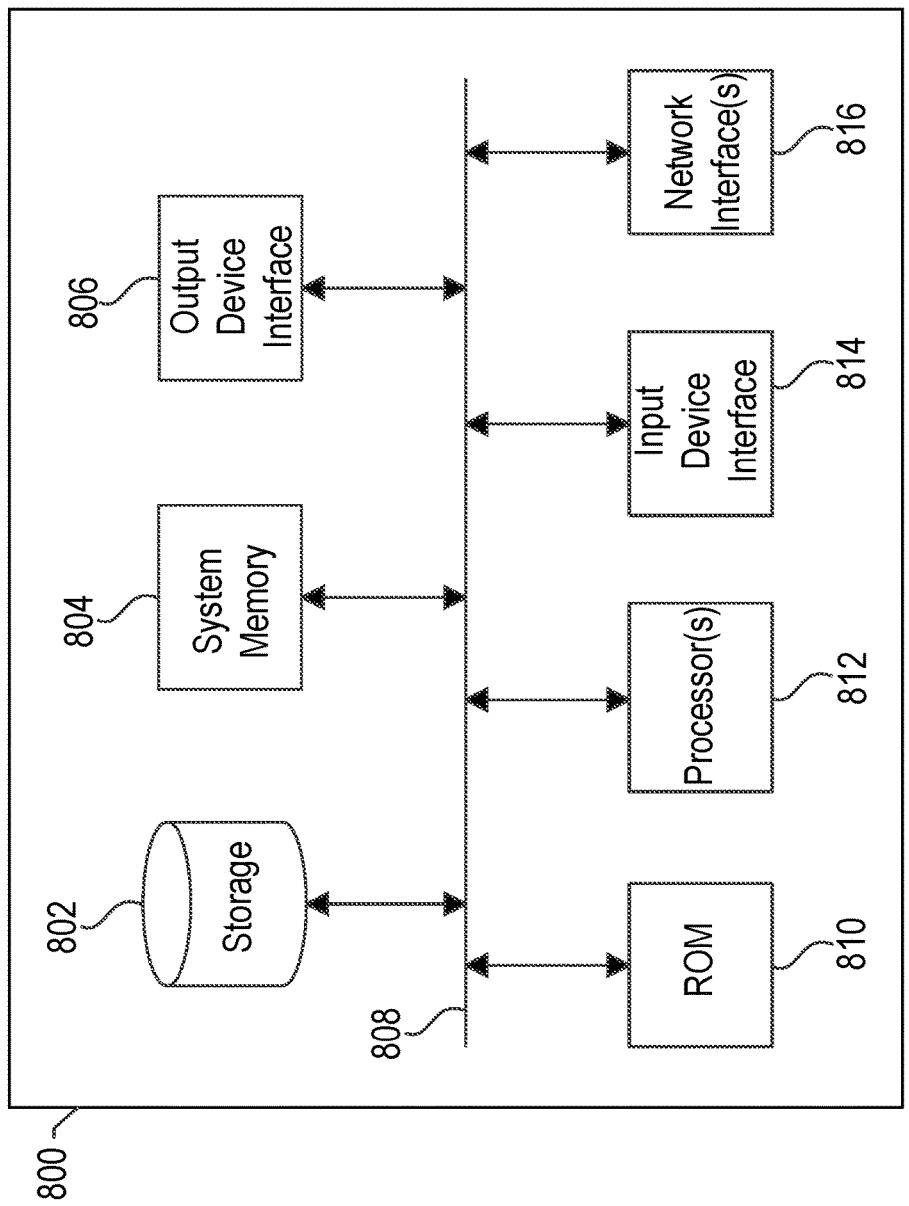
FIG. 8 conceptually illustrates an electronic system with which one or more implementations of the subject technology may be implemented.

FIG. 8 conceptually illustrates an electronic system 800 with which one or more implementations of the subject technology may be implemented. The electronic system 800, for example, may be, or may be coupled to, a powertrain system, a chassis system, a telematics system, an entertainment system, a camera system, a sensor system, such as a lane departure system, a diagnostics system, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 800 can be, and/or can be a part of, one or more of the network devices 102A-C and/or the network coordinator device 104. Such an electronic system includes various types of computer readable media and interfaces for various other types of computer readable media. The electronic system 800 includes a bus 808, one or more processor(s) 812, a system memory 804 or buffer, a read-only memory (ROM) 810, a permanent storage device 802, an input device interface 814, an output device interface 806, and one or more network interface(s) 816, or subsets and variations thereof.

The bus 808 collectively represents all system, peripheral, and chipset buses that communicatively connect the numerous internal devices of the electronic system 800. In one or more implementations, the bus 808 communicatively connects the one or more processor(s) 812 with the ROM 810, the system memory 804, and the permanent storage device 802. From these various memory units, the one or more processor(s) 812 retrieve instructions to execute and data to process in order to execute the processes of the subject disclosure. The one or more processor(s) 812 can be a single processor or a multi-core processor in different implementations.

The ROM 810 stores static data and instructions that are needed by the one or more processor(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processor(s) 812 may need at runtime. In one or more implementations, the processes of the subject disclosure are stored in the system memory 804, the permanent storage device 802, and/or the ROM 810. From these various memory units, the one or more processor(s) 812 retrieve instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by the electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 8, the bus 808 also couples the electronic system 800 to one or more networks (not shown) through one or more network interface(s) 816. One or more network interface(s) may include an Ethernet interface, a WiFi interface, a cellular interface, a mmWave interface, a reduced gigabit media independent interface (RGMII), or generally any interface for connecting to a network. The one or more network interfaces 816 may include, or may be coupled to, a physical layer module. In this manner, the electronic system 800 can be a part of one or more networks of computers (such as a local area network ("LAN"), a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   at least one processor configured to:
      transmit a first request to enter an unscheduled power save mode to a network coordinator device of a network;
      receive, from the network coordinator device, a first acknowledgement of the first request;
      responsive to receipt of the first acknowledgement of the first request, transmit a first indication of entering the unscheduled power save mode to at least one other device of the network;
      enter the unscheduled power save mode responsive to receipt of a second acknowledgment of the first indication from the at least one other device;
      exit the unscheduled power save mode responsive to receipt, from the network coordinator device, of a third acknowledgment of a second request to exit the unscheduled power save mode;
      transmit a second indication of exiting the unscheduled power save mode to the at least one other device of the network upon exiting the unscheduled power save mode; and
      subsequent to transmission of the second indication of exiting the power save mode to the at least one other device of the network, receive, from the network coordinator device, a beacon message that indicates that the device exited the unscheduled power save mode, the beacon message being separate from the third acknowledgment of the second request to exit the unscheduled power save mode, wherein the beacon message is received by the at least one other device at least when the at least one other device is not in a power save mode.

2. The device of claim 1, wherein the processor is further configured to:
   when in the unscheduled power save mode, transmit the second request to exit the unscheduled power save mode to the network coordinator device of the network.

3. The device of claim 2, wherein the processor is further configured to:
   transmit the first indication of entering the unscheduled power save mode to the at least one other device via a peer-to-peer transmission; and
   transmit the second indication of exiting the unscheduled power save mode to the at least one other device via the peer-to-peer transmission.

4. The device of claim 2, wherein the processor is further configured to:
   reconfigure beamforming with the at least one other device upon exiting the unscheduled power save mode.

5. The device of claim 1, wherein the processor is further configured to:
   determine a plurality of devices of the network with which the processor has been in active communication with; and
   responsive to receipt of the first acknowledgement of the first request, transmit the first indication of entering the unscheduled power save mode to each of the plurality of devices, the plurality of devices comprising the at least one other device.

6. The device of claim 1, wherein the processor is further configured to:
   retransmit the first request to enter the unscheduled power save mode when the first acknowledgment is not received in a predetermined amount of time.

7. The device of claim 1, wherein the processor is further configured to:
   enter the unscheduled power save mode responsive to transmitting the first indication of entering the unscheduled power save mode to the at least one other device of the network.

8. The device of claim 1, wherein the processor is further configured to:
   enter the unscheduled power save mode prior to a scheduled power save mode and remain in the unscheduled power save mode throughout the scheduled power save mode.

9. The device of claim 1, wherein the network coordinator device comprises at least one of an access point or a personal basic service set coordination point, and the beacon message further indicates whether the network coordinator device has entered the unscheduled power save mode.

10. The device of claim 1, wherein the processor is further configured to:
receive, from the network coordinator device, a data item that indicates which devices of the network are in the unscheduled power save mode, the data item comprising a network coordinator device unscheduled power save mode indication field and a non-network coordinator device unscheduled power save mode indication field; and
determine, based on the network coordinator device unscheduled power save mode indication field and the non-network coordinator device unscheduled power save mode indication field whether any of the devices of the network are in the unscheduled power save mode.

11. The device of claim 10, wherein the network coordinator device unscheduled power save mode indication field and the non-network coordinator device unscheduled power save mode indication field each comprise one bit.

12. A method comprising:
receiving, from a network coordinator device of a network, a first acknowledgement of a first request to enter an unscheduled power save mode;
responsive to receipt of the first acknowledgement of the first request, transmitting, by a device, a first indication of entering the unscheduled power save mode to at least one other device of the network via a peer-to-peer communication;
entering the unscheduled power save mode responsive to receipt of a second acknowledgment of the first indication from the at least one other device;
exiting the unscheduled power save mode responsive to receipt, from the network coordinator device, of a third acknowledgment of a second request to exit the unscheduled power save mode;
transmitting a second indication of exiting the unscheduled power save mode to the at least one other device of the network upon exiting the unscheduled power save mode; and
receiving, from the network coordinator device, a beacon message that indicates that the device exited the unscheduled power save mode, the beacon message being separate from the third acknowledgment of the second request to exit the unscheduled power save mode, wherein the beacon message is received by the at least one other device at least when the at least one other device is not in a power save mode.

13. The method of claim 12, further comprising:
when in the unscheduled power save mode, receiving, from the network coordinator device, the third acknowledgement of the second request to exit the unscheduled power save mode.

14. The method of claim 12, wherein the peer-to-peer communication is transmitted directly to the at least one other device, bypassing the network coordinator device and independent of coordination from the network coordinator device.

15. The method of claim 12, further comprising:
determining, based on at least one heuristic, a plurality of devices of the network to transmit the first indication of entering the unscheduled power save mode to; and
responsive to receipt of the first acknowledgement of the first request, transmit the first indication of entering the unscheduled power save mode to each of the plurality of devices, the plurality of devices comprising the at least one other device.

16. The method of claim 12, further comprising:
receiving, from the network coordinator device, a data item that indicates which devices of the network are in the unscheduled power save mode, the data item comprising a network coordinator device unscheduled power save mode indication field and a non-network coordinator device unscheduled power save mode indication field; and
determine, based on the network coordinator device unscheduled power save mode indication field and the non-network coordinator device unscheduled power save mode indication field whether any of the devices of the network are in the unscheduled power save mode.

17. The method of claim 16, wherein the data item further comprises a length field, and the method further comprising:
determining whether all or some of the devices are in the unscheduled power save mode based at least in part on the length field, the network coordinator device unscheduled power save mode indication field and the non-network coordinator device unscheduled power save mode indication field.

18. A computer program product comprising code stored in a non-transitory computer-readable storage medium, the code comprising:
code to receive, from a network coordinator device of a network, an acknowledgement of a request to enter an unscheduled power save mode;
code to transmit, by a device, responsive to receipt of the acknowledgement and prior to entering the unscheduled power save mode, an indication of entering the unscheduled power save mode to at least one other device of the network;
code to enter the unscheduled power save mode responsive to receipt of another acknowledgement of the indication from the at least one other device;
code to transmit another indication of exiting the unscheduled power save mode to the at least one other device of the network upon exiting the unscheduled power save mode; and
code to receive, from the network coordinator device, a beacon message that indicates that the device exited the unscheduled power save mode, wherein the beacon message is received by the at least one other device at least when the at least one other device is not in a power save mode.

19. The computer program product of claim 18, the code further comprising:
code to exit the unscheduled power save mode responsive to receipt, from the network coordinator device, of an acknowledgment of a request to exit the unscheduled power save mode.

* * * * *